(12) United States Patent
Thallam Kodandaramaih et al.

(10) Patent No.: US 11,288,251 B2
(45) Date of Patent: Mar. 29, 2022

(54) SUPPORTING CONCURRENT UPDATES TO A DATABASE PAGE

(71) Applicant: Microsoft Technology Licensing, LLC, Redmond, WA (US)

(72) Inventors: Raghavendra Thallam Kodandaramaih, Redmond, WA (US); Girish Mittur Venkataramanappa, Redmond, WA (US); Hanumantha Rao Kodavalla, Sammamish, WA (US); Peter Byrne, Charlotte Hall, MD (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 718 days.

(21) Appl. No.: 16/116,601

(22) Filed: Aug. 29, 2018

(65) Prior Publication Data
US 2019/0362001 A1   Nov. 28, 2019

Related U.S. Application Data

(60) Provisional application No. 62/695,668, filed on Jul. 9, 2018, provisional application No. 62/676,862, filed on May 25, 2018.

(51) Int. Cl.
| G06F 16/30 | (2019.01) |
| G06F 16/23 | (2019.01) |
| G06F 16/27 | (2019.01) |
| G06F 16/22 | (2019.01) |

(52) U.S. Cl.
CPC ...... *G06F 16/2308* (2019.01); *G06F 16/2246* (2019.01); *G06F 16/2358* (2019.01); *G06F 16/27* (2019.01)

(58) Field of Classification Search
CPC .......... G06F 16/2246; G06F 16/2308; G06F 16/2358; G06F 16/27
See application file for complete search history.

(56) References Cited

U.S. PATENT DOCUMENTS

| 8,682,872 B2 * | 3/2014 | Bright | G06F 16/2246 |
| | | | 707/696 |
| 2002/0087500 A1 * | 7/2002 | Berkowitz | G06F 16/2365 |
| 2005/0289189 A1 * | 12/2005 | Nettleton | G06F 16/2343 |

(Continued)

OTHER PUBLICATIONS

Article entitled "Algorithms for Flexible Space Management in Transaction Systems Supporting Fine-Granularity Locking", by Mohan et al., dated 1994 (Year: 1994).*

(Continued)

*Primary Examiner* — Mahesh H Dwivedi
(74) *Attorney, Agent, or Firm* — Ray Quinney & Nebeker P.C; James Bullough (57) ABSTRACT

A method for supporting concurrent updates to a database page may include providing shared access to the database page. A first update may be performed with respect to a first record in the database page. A second update may be performed with respect to a second record in the database page. The first update and the second update may be performed concurrently while the shared access to the database page is being provided. The method may also include synchronizing the first update and the second update.

18 Claims, 8 Drawing Sheets

(56) References Cited

U.S. PATENT DOCUMENTS

| | | | |
|---|---|---|---|
| 2012/0179655 A1* | 7/2012 | Beatty | G06F 16/128 707/646 |
| 2012/0226668 A1* | 9/2012 | Dhamankar | G06F 11/1471 707/690 |
| 2014/0379991 A1* | 12/2014 | Lomet | G06F 12/123 711/135 |
| 2016/0044081 A1* | 2/2016 | Pingenot | H04L 63/08 709/219 |
| 2016/0092488 A1* | 3/2016 | Sun | G06F 16/2365 707/690 |
| 2017/0046377 A1* | 2/2017 | Barber | G06F 16/2365 |

OTHER PUBLICATIONS

Article entitled "PFS Pages: How SQL Server tracks Page Free Space", by Sqlity, dated Apr. 30, 2014 (Year: 2014).*

Article entitled "Concurrent Updates to Pages with Fixed-Size Rows Using Lock-Free Algorithms", by Kodandaramaih et al., dated Aug. 2020 (Year: 2020).*

Article entitled "ARIES: A Transaction Recovery Method Supporting Fine-Granularity Locking and Partial Rollbacks Using Write-Ahead Logging", by Haderle et al., dated 1992 (Year: 1992).*

Article entitled "ARIES/IM: An Efficient and High Concurrency Index Management Method Using Write-Ahead Logging", by Levine et al., dated 1992 (Year: 1992).*

"Recommendations to reduce allocation contention in SQL Server tempdb database", Retrieved from: https://support.microsoft.com/en-us/help/2154845/recommendations-to-reduce-allocation-contention-in-sql-server-tempdb-d, Retrieved on Mar. 23, 2018, 2 Pages.

Ganger, et al., "Soft Updates: A Solution to the Metadata Update Problem in File Systems", In Journal of ACM Transactions on Computer Systems, vol. 18, No. 2, May 2000, 45 Pages.

Randal, Paul, "The Accidental DBA (Day 27 of 30): Troubleshooting: Tempdb Contention", Retrieved from: https://www.sqlskills.com/blogs/paul/the-accidental-dba-day-27-of-30-troubleshooting-tempdb-contention/, Jun. 27, 2013, 15 Pages.

"Free Space Map", Retrieved from: https://web.archive.org/web/20200925185722/https://www.postgresql.org/docs/9.2/storage-fsm.html, Sep. 25, 2020, 1 Page.

"Under The Covers: GAM, SGAM, and PFS Pages", Retrieved from: https://techcommunity.microsoft.com/t5/sql-server/under-the-covers-gam-sgam-and-pfs-pages/ba-p/383125, Mar. 23, 2019, 5 Pages.

"Vacuum", Retrieved from: https://web.archive.org/web/20190108015242/https://www.postgresql.org/docs/9.1/sql-vacuum.html, Jan. 8, 2019, 3 Pages.

Antonopoulos, et al., "Constant Time Recovery in Azure SQL Database", In Proceedings of the VLDB Endowment, vol. 12, Issue 12, Aug. 2019, pp. 2143-2154.

Astrahan, et al., "System R: Relational Approach to Database Management", In Journal of ACM Transactions on Database Systems, vol. 1, Issue 2, Jun. 1, 1976, pp. 97-137.

David, et al., "Everything You Always Wanted to Know About Synchronization but Were Afraid to Ask", In Proceedings of the Twenty-Fourth ACM Symposium on Operating Systems Principles, Nov. 3, 2013, pp. 33-48.

Delaney, et al., "Microsoft SQL Server 2008 Internals", In Publication of Microsoft Press, 2009, 89 Pages.

Faleiro, et al., "Latch-Free Synchronization in Database Systems: Silver Bullet or Fool's Gold", In Proceedings of 8th Biennial Conference on Innovative Data Systems Research, Jan. 8, 2017, 12 Pages.

Hironobu, Suzuki, "The Internals of PostgreSQL", Retrieved from: https://web.archive.org/web/20151205190312/http://www.interdb.jp/pg/pgsql01.html, Dec. 5, 2015, 8 Pages.

Konidena, et al., "Description of the Replay Markup Language Utilities for SQL Server", Retrieved from: https://docs.microsoft.com/en-US/troubleshoot/sql/tools/replay-markup-language-utility, Mar. 9, 2020, 6 Pages.

Masha, et al., "Accelerated Database Recovery", Retrieved from: https://web.archive.org/web/20190603171146/https://docs.microsoft.com/en-us/azure/sql-database/sql-database-accelerated-database-recovery, Jan. 25, 2019, 3 Pages.

Mohan, C., "IBM's Relational DBMS Products: Features and Technologies", In Proceedings of ACM SIGMOD International Conference on Management of Data, Jun. 1, 1993, pp. 445-448.

Sears, et al., "Segment-Based Recovery: Write-Ahead Logging Revisited", In Proceedings of the VLDB Endowment, vol. 2, Issue 1, Aug. 24, 2009, pp. 490-501.

Weikum, et al., "The LRU-K Page Replacement Algorithm for Database Disk Buffering", In Journal of ACM Sigmod Record, vol. 22, Issue 2, Jun. 1, 1993, pp. 297-306.

* cited by examiner

SUPPORTING CONCURRENT UPDATES TO A DATABASE PAGE

CROSS-REFERENCE TO RELATED APPLICATIONS

This application is related to and claims the benefit of U.S. Provisional Patent Application Ser. No. 62/695,668, filed Jul. 9, 2018, titled "SUPPORTING CONCURRENT UPDATES TO A DATABASE PAGE." This application is also related to and claims the benefit of U.S. Provisional Patent Application Ser. No. 62/676,862, filed May 25, 2018, titled "SUPPORTING CONCURRENT UPDATES TO A DATABASE PAGE USING AN ALTERNATIVE SYNCHRONIZATION MECHANISM INSTEAD OF AN EXCLUSIVE PAGE LATCH." Each of the aforementioned applications is expressly incorporated herein by reference in its entirety.

BACKGROUND

A relational database is a collection of data items organized as a set of formally described tables from which data can be accessed. A relational database management system (which may be referred to herein simply as a database system) facilitates access to a relational database by receiving queries from users, applications, or other entities, executing such queries against the relational database to produce a results dataset, and returning the results dataset to the entities that submitted the queries. The queries may be represented using Structured Query Language (SQL) or another suitable database query language.

The fundamental unit of storage in a database system is typically referred to as a database page (or simply a page). The disk space allocated to a data file in a database is logically divided into database pages, which may be numbered contiguously from 0 to N. Disk input/output operations are typically performed at the database page level. In other words, a database system typically reads or writes whole database pages.

Database pages may be updated by threads. In this context, the term "thread" refers to a unit of execution within a computing system. A thread may be the smallest sequence of programmed instructions that can be managed independently for scheduling purposes. Multiple threads can exist within one process, executing concurrently and sharing resources such as memory.

In the context of a relational database, the term "transaction" refers to a unit of work performed against a database that may be treated in a coherent and reliable way independent of other transactions. A database transaction should be atomic, consistent, isolated, and durable. Atomicity means that each transaction is treated as a single unit that either succeeds completely or fails completely. Consistency ensures that a transaction can only bring the database from one valid state to another. Isolation ensures that concurrent execution of transactions leaves the database in the same state that would have been obtained if the transactions were executed sequentially. Durability means that once a transaction has been committed, it will remain committed even in the event of a system failure (e.g., a power outage or crash). Database practitioners often refer to these properties of database transactions using the acronym ACID.

If a system failure affects the operation of a database system, it is generally desirable to recover the database and return to normal operation as quickly as possible. Recovery algorithms have been developed for this purpose. One family of recovery algorithms is known as Algorithms for Recovery and Isolation Exploiting Semantics (ARIES).

One aspect of ARIES algorithms is write-ahead logging. With write-ahead logging, any change to a database page is first recorded in a transaction log, and the transaction log is written to stable storage before changes to the database page are written to disk. Log entries are sequentially ordered with log sequence numbers.

To facilitate write-ahead logging, a database page that is going to be updated may first be read into a buffer. The desired updates may be recorded in the transaction log. The updates may then be made to the copy of the database page in the buffer. Finally, the copy of the database page in the buffer may be flushed back to disk (i.e., written to storage).

Another aspect of ARIES algorithms is dirty page tracking. Dirty page tracking involves keeping track of which database pages are "dirty." In the context of a database system that utilizes write-ahead logging, a dirty page is a database page that has been updated in the buffer but not yet flushed back to disk.

DETAILED DESCRIPTION

In a database system that uses write-ahead logging techniques, a thread that is going to update a database page typically reserves exclusive access to the database page. For example, the thread may obtain an exclusive latch (or an update latch) for the database page. The purpose of reserving exclusive access is to synchronize the update with other updates that may be performed with respect to the database page while also allowing reads in parallel. In this context, the term "synchronize" refers to one or more operations that may be performed to ensure the integrity of updates that are made to a database. Synchronization makes it possible to serialize the log records and updates to the database page. Synchronization may be performed in relation to updates that are part of the same transaction. Thus, reserving exclusive access to perform an update may help ensure that the update can be safely performed and recovered in the event of a system failure.

One problem with obtaining exclusive access to a database page is that a thread may perform a large number of operations while exclusive access is maintained. This may adversely affect the transaction throughput because many other threads might be contending to obtain exclusive access to the database page. The time that these other threads spend waiting to obtain exclusive access to the database page is essentially wasted.

The present disclosure is generally related to techniques for supporting concurrent updates to a database page. In accordance with the present disclosure, a thread that is going to update a database page may, under some circumstances, reserve shared access to the database page instead of reserving exclusive access. This enables multiple threads to be able to concurrently update the database page. Synchronization may be performed using an alternative approach other than reserving exclusive access. For example, instead of reserving exclusive access to the database page that is going to be updated, a thread may reserve exclusive access to another database element (e.g., another database page) that corresponds to the particular record that is going to be updated in the database page. Functions that ensure atomicity may be used for the kinds of operations that are typically performed to facilitate recovery, such as generating log records and managing dirty page tracking.

Figure 1:
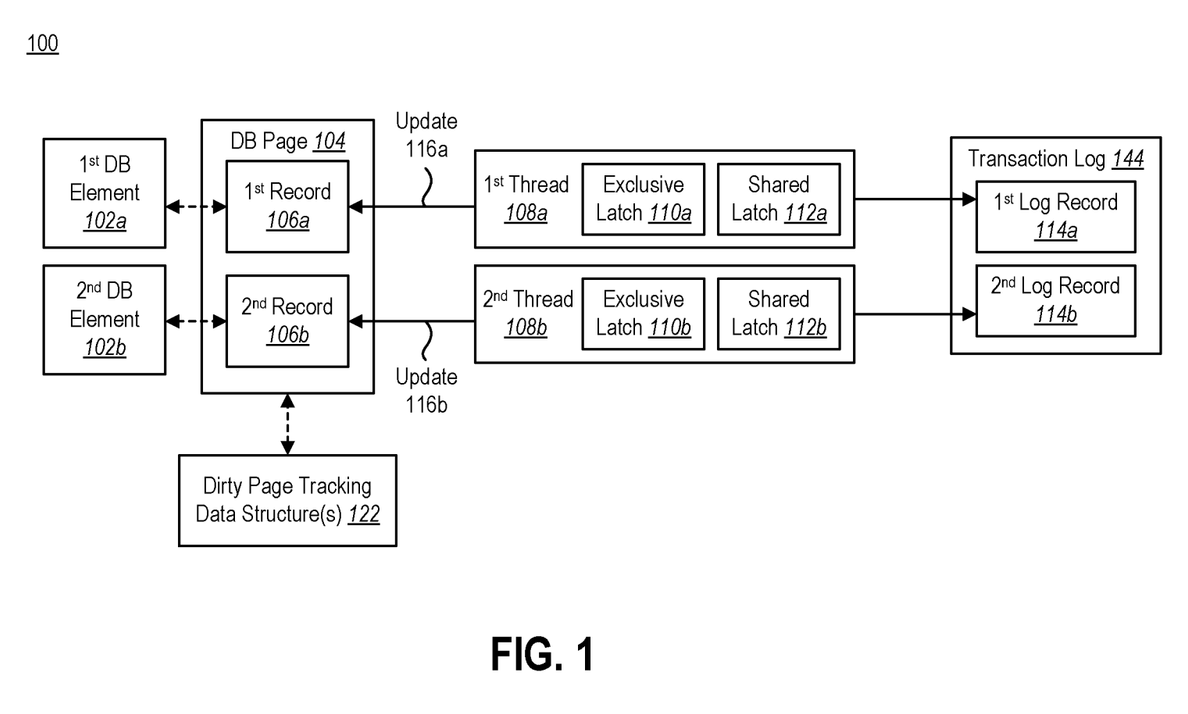
FIG. 1 illustrates an example of a database system that is configured to support concurrent updates to a database page in accordance with the present disclosure.

FIG. 1 illustrates an example of a database system 100 that is configured to support concurrent updates to a database page 104 in accordance with the present disclosure. In this example, it will be assumed that multiple threads 108a-b are going to perform updates 116a-b with respect to records 106a-b in the database page 104. With known approaches, these updates 116a-b would be performed serially. In accordance with the present disclosure, however, these updates 116a-b may be performed in parallel.

With known approaches, a thread that updates a database page reserves exclusive access to the database page. In accordance with the present disclosure, however, the threads 108a-b that are going to update the database page 104 may reserve shared access to the database page 104 instead of reserving exclusive access. Synchronization may then be performed using an alternative approach other than reserving exclusive access. For instance, instead of reserving exclusive access to the database page 104, the threads 108a-b may reserve exclusive access to other database elements 102a-b that correspond to the particular records 106a-b in the database page 104 that are going to be updated.

In the depicted example, the first thread 108a is going to update a first record 106a in the database page 104. The first record 106a may correspond to a first database element 102a, such that having exclusive access to the first database element 102a may protect the integrity of any updates that are made to the first record 106a. In other words, if the first thread 108a obtains exclusive access to the first database element 102a, it may be unlikely (or, in some cases, impossible) that another thread would update the first record 106a in the database page 104 as long as the first thread 108a maintains exclusive access to the first database element 102a.

In this kind of scenario, the first thread 108a may obtain exclusive access to the first database element 102a and shared access to the database page 104, so that other threads may also have shared access to the database page 104. This would allow, for example, the second thread 108b to perform an update 116b with respect to a second record 106b in the database page 104 at the same time that the first thread 108a performs an update 116a with respect to the first record 106a.

In some implementations, the first thread 108a may obtain an exclusive latch 110a for the first database element 102a and a shared latch 112a for the database page 104. Similarly, the second thread 108b may obtain an exclusive latch 110b for the second database element 102b and a shared latch 112b for the database page 104.

In this context, the term "latch" refers to a representation of an intent to utilize a database resource. A latch may be obtained by a thread with respect to a particular resource (e.g., a database page). If a thread obtains an exclusive latch with respect to a particular resource, then no other thread is able to use that resource while the exclusive latch is active. An exclusive latch may be used to protect the integrity of updates that are being made to records, so that the updates are not compromised (e.g., overwritten) by other updates that are being performed concurrently. Another type of latch is a shared latch. If a thread obtains a shared latch with respect to a resource, this does not prevent other threads from also using that resource in parallel.

The updates 116a-b to the database page 104 may be structured so that the updates 116a-b do not result in cascading operations (e.g., page split, merge) being performed with respect to the database page 104. For example, the updates 116a-b may be structured so that they do not cause any of the records 106a-b in the database page 104 to be moved to another database page (or any records from another database page to be moved to the database page 104). This helps ensure the integrity of the updates 116a-b without providing exclusive access to either of the threads 108a-b. In some implementations, the records 106a-b within the database page 104 may have a fixed size. This is not required, however, and in alternative implementations the records 106a-b may have a variable size.

The database system 100 may be configured to implement one or more algorithms that facilitate recovery in the event of system failure. Such algorithms typically assume that when a thread is updating a database page, the thread has exclusive access to that database page. In a database system 100 where multiple threads 108a-b can simultaneously have shared access to a database page 104 and perform updates 116a-b with respect to that database page 104, the recovery algorithm(s) may need to be modified in order to function properly. These modifications may be related to generating log records 114a-b in a transaction log 144 and managing data structure(s) 122 for dirty page tracking. Some specific examples of modifications to the recovery algorithm(s) will be discussed below.

Figure 2:
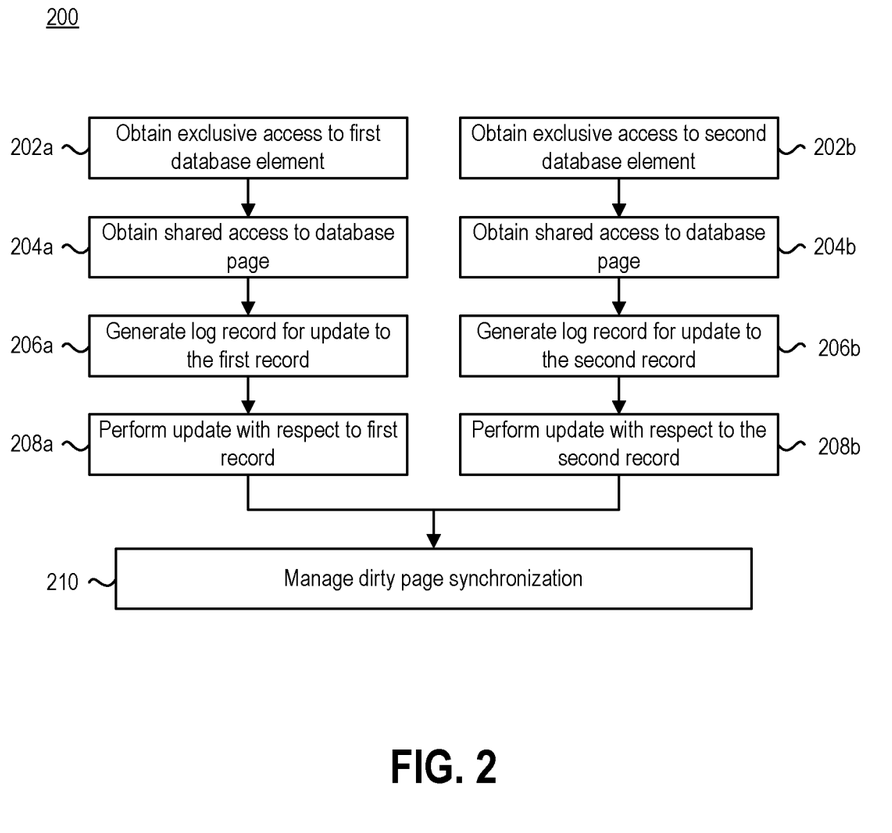
FIG. 2 illustrates a method for supporting concurrent updates to a database page.

FIG. 2 illustrates an example of a method 200 for supporting concurrent updates 116a-b to a database page 104. The method 200 will be described in relation to the database system 100 shown in FIG. 1. The method 200 shows how the first thread 108a may update the first record 106a in the database page 104 in a way that other threads (e.g., the second thread 108b) may simultaneously update other records (e.g., the second record 106b) in the database page 104.

In the depicted method 200, some of the operations 202a, 204a, 206a, 208a may be performed by the first thread 108a, while other operations 202b, 204b, 206b, 208a may be performed by the second thread 108b. The first thread 108a may perform the operations 202a, 204a, 206a, 208a in parallel with the second thread 108b performing the operations 202b, 204b, 206b, 208a. The other operation 210 in the method 200 may be performed collectively by both of the threads 108a-b working together and/or by one or more other components of the database system 100.

In accordance with the method 200, a first thread 108a that is going to update a first record 106a in a database page 104 may obtain 202a exclusive access to a first database element 102a corresponding to the first record 106a. For example, the first thread 108a may obtain an exclusive latch 110a for the first database element 102a. Obtaining 202a exclusive access to the first database element 102a may prevent any other threads from updating the first database element 102a as long as the first thread 108a has exclusive access to the first database element 102a. Obtaining 202a exclusive access to the first database element 102a may also make it unlikely (or, in some cases, impossible) for any other thread to update the first record 106a in the database page 104 as long as the first thread 108a has exclusive access to the first database element 102a.

The first thread 108a may also obtain 204a shared access to the database page 104. For example, the first thread 108a may obtain a shared latch 112a for the database page 104. Having shared access to the database page 104 does not prevent other threads (such as the second thread 108b) from simultaneously updating the database page 104.

A second thread 108b that is going to update a second record 106b in the database page 104 may obtain 202b exclusive access to a second database element 102b corresponding to the second record 106b. For example, the second thread 108b may obtain an exclusive latch 110b for the second database element 102b. The second thread 108b may also obtain 204b shared access to the database page 104. For example, the second thread 108b may obtain a shared latch 112b for the database page 104. These operations 202b, 204b may be performed in parallel to the similar operations 202a, 204a performed by the first thread 108a.

To facilitate recovery in the event of system failure, the first thread 108a may generate 206a a first log record 114a for the update 116a to the first record 106a. Similarly, the second thread 108b may generate 206b a second log record 114b for the update 116b to the second record 106b. The log records 114a-b may be stored in a transaction log 144.

The first thread 108a may perform 208a an update 116a with respect to the first record 106a in the database page 104, and the second thread 108b may perform 208b an update 116b with respect to the second record 106b in the database page 104. These updates 116a-b may be performed in parallel with one another.

The database system 100 may also manage 210 dirty page synchronization. This may involve creating and maintaining one or more data structure(s) 122 that facilitate dirty page tracking. Some additional examples of how dirty page synchronization may be managed 210 will be provided below.

Figure 3:
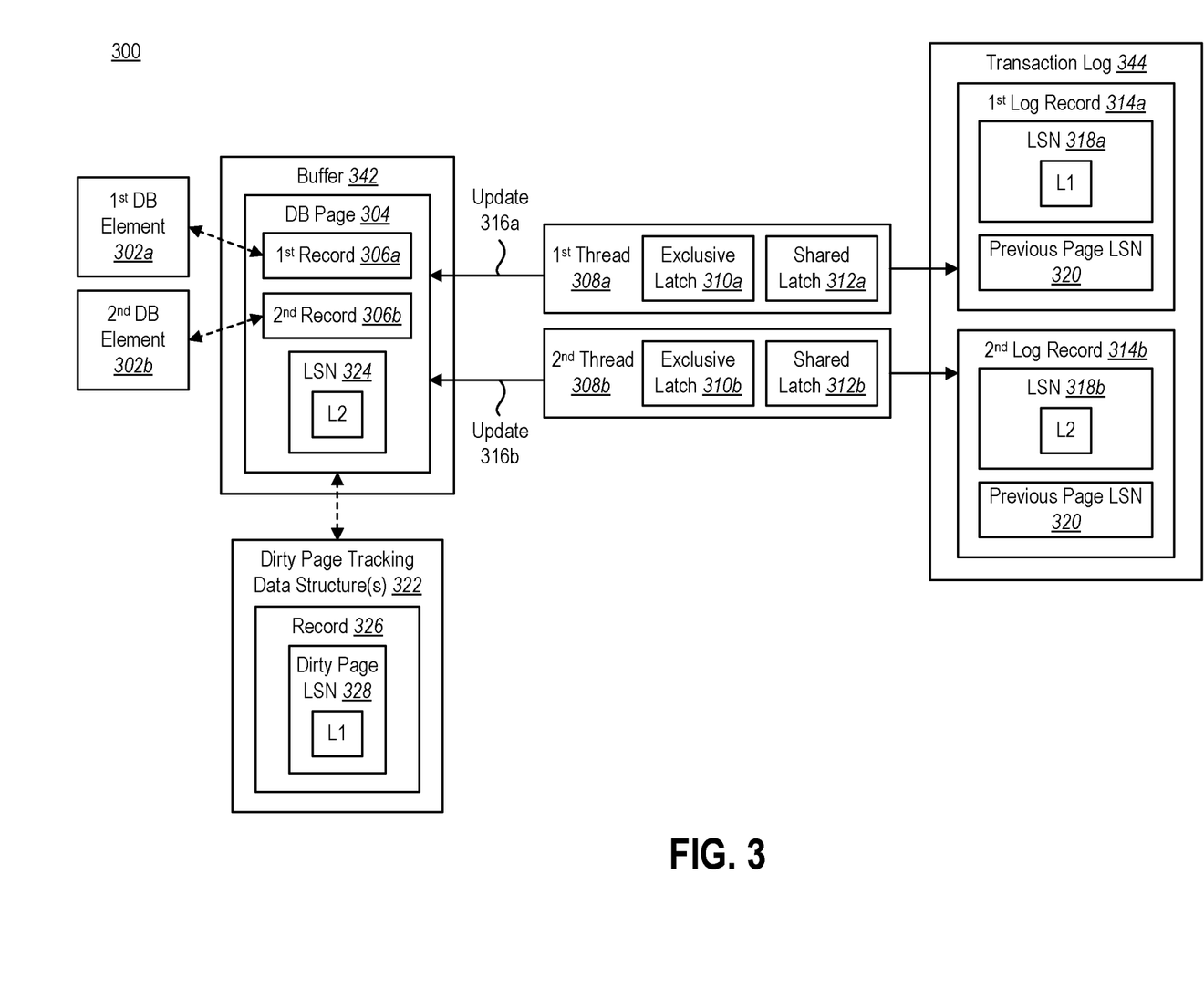
FIG. 3 illustrates an example of a database system that utilizes write-ahead logging techniques and that is configured to support concurrent updates to a database page in accordance with the present disclosure.

FIG. 3 illustrates another example of a database system 300 that is configured to support concurrent updates to a database page 304 in accordance with the present disclosure. The database system 300 in FIG. 3 is similar in some respects to the database system 100 in FIG. 1. For example, multiple threads 308a-b may concurrently perform updates 316a-b to records 306a-b in a database page 304. To synchronize these updates 316a-b without reserving exclusive access to the database page 304, the threads 308a-b may reserve exclusive access to database elements 302a-b corresponding to the records 306a-b that are going to be updated. For example, a first thread 308a that is going to update a first record 306a in the database page 304 may obtain an exclusive latch 310a for a first database element 302a corresponding to the first record 306a. Similarly, a second thread 308b that is going to update a second record 306b in the database page 304 may obtain an exclusive latch 310b for a second database element 302b corresponding to the second record 306b. The threads 308a-b may obtain shared latches 312a-b for the database page 304 that includes the records 306a-b to be updated.

The database system 300 may be configured to use write-ahead logging techniques. As a result, the database page 304 that is going to be updated may be read from storage into a buffer 342. Log records 314a-b for the desired updates 316a-b may be generated and stored in a transaction log 344. The updates 316a-b may then be made to the database page 304 in the buffer 342. After the updates 316a-b (and other operations related to facilitating recovery in the event of system failure) have been performed, the database page 304 may be flushed to disk (or in other words, written to storage).

The database page 304 may be prepared for dirty page tracking in accordance with a recovery algorithm, such as an ARIES recovery algorithm. Both the first thread 308a and the second thread 308b may attempt to set up one or more data structures 322 for tracking dirty pages. These attempts may be structured so that only one of the threads 308a-b successfully creates the data structure(s) 322. In some implementations, the threads 308a-b may use one or more functions that ensure atomicity to set up the data structure(s) 322. For example, the threads 308a-b may use one or more compare-and-swap operations to set up the data structure(s) 322. In this context, the term "compare-and-swap" refers to an atomic instruction used in multithreading to achieve synchronization. In a compare-and-swap operation, the contents of a memory location are compared with a given value and, only if they are the same, the contents of that memory location are given a new value. This is done as a single atomic operation. The atomicity guarantees that the new value is calculated based on up-to-date information. In some implementations, the compare-and-swap operation(s) described herein may be performed using interlocked compare exchange (ICX) function(s).

For purposes of the present example, it will be assumed that the first thread 308a successfully creates the dirty page tracking data structure(s) 322 and that the second thread 308b fails. The second thread 308b uses the dirty page tracking data structure(s) 322 that were created by the first thread 308a.

The first thread 308a may generate a first log record 314a corresponding to the update 316a that will be performed with respect to the first record 306a. The second thread 308b may generate a second log record 314b corresponding to the update 316b that will be performed with respect to the second record 306b. The log sequence number (LSN) 318a of the first log record 314a may be different from the LSN 318b of the second log record 314b. For purposes of the present example, it will be assumed that the LSN 318a of the first log record 314a has a value of L1, the LSN 318b of the second log record 314b has a value of L2, and L2>L1.

As noted above, in currently known database systems, updates to a database page are performed serially so that only one update is performed at a time. In such database systems, when an update is performed, the LSN of the database page is set to the LSN of the log record that is created in connection with the update. Setting the LSN of the database page in this manner facilitates recovery from system failure. The present disclosure, however, makes it possible for a database system 300 to perform multiple updates 316a-b concurrently. To facilitate recovery operations in this type of database system 300, the LSN 324 of the database page 304 may be set to the maximum of the LSNs 318a-b of the log records 314a-b associated with the updates 316a-b that have been performed with respect to the database page 304.

In the present example, the update 316a performed by the first thread 308a is associated with a log record 314a having an LSN 318a of L1, and the update 316b performed by the second thread 308b is associated with a log record 314b having an LSN 318b of L2, where L2>L1. Thus, in the present example, the LSN 324 of the database page 304 may be set to L2. The maximum value of the LSNs 318a-b may be determined using one or more compare-and-swap operations. In some implementations, the maximum value of the LSNs 318a-b may be determined using an interlocked maximum LSN operator, which may be built using interlocked compare exchange operators.

The database page 304 may be marked as "dirty" in the dirty page tracking data structure(s) 322. A record 326 corresponding to the database page 304 may be created in the dirty page tracking data structure(s) 322. This record 326 may include an LSN 328, which may be referred to herein as a dirty page LSN 328.

In currently known database systems, when an update is performed, the value of the dirty page LSN is set to the LSN of the log record that first updated the page in the current flush cycle (i.e., since the page was most recently flushed to disk). In a database system 300 in accordance with the present disclosure, however, multiple threads 308a-b may simultaneously perform updates 316a-b with respect to the database page 304. In the presence of multiple concurrent threads 308a-b that are trying to dirty the database page 304, the dirty page LSN 328 may be set to the minimum of the LSNs 318a-b of the log records 314a-b associated with the updates 316a-b that dirtied the database page 304. Thus, in the present example, the dirty page LSN 328 corresponding to the database page 304 may be set to L1.

To determine the minimum of the LSNs 318a-b of the log records 314a-b associated with the updates 316a-b that dirtied the database page 304, all the threads 308a-b that have performed updates 316a-b with respect to the database page 304 (and which therefore have generated log records 314a-b) should contribute to the computation of the dirty page LSN 328. The minimum value of the LSNs 318a-b that dirtied the database page 304 may be determined using one or more compare-and-swap operations. In some implementations, the minimum value of the LSNs 318a-b that dirtied the database page 304 may be determined using an interlocked minimum LSN operator, which may be built using interlocked compare exchange operators.

Although the log records 314a-b correspond to different database elements 302a-b, the log records 314a-b may have the same previous page LSN 320. In accordance with known recovery algorithms (e.g., ARIES recovery algorithms), when redo operations are performed with respect to log records, the LSN checks are very strict in order to detect missed flushes. As a result, the previous page LSN values are taken into account. In accordance with the present disclosure, however, the redo of the log records 314a-b may be performed starting from the dirty page LSN 328 without checking the previous page LSN 320 values, because it may not be possible to rely on the previous page LSN 320 values for purposes of redo operations. By redoing all of the log records 314a-b starting from the dirty page LSN 328, it may be possible to guarantee that all of the operations that were logged before a system failure can still be performed even after the system failure.

Figure 4:
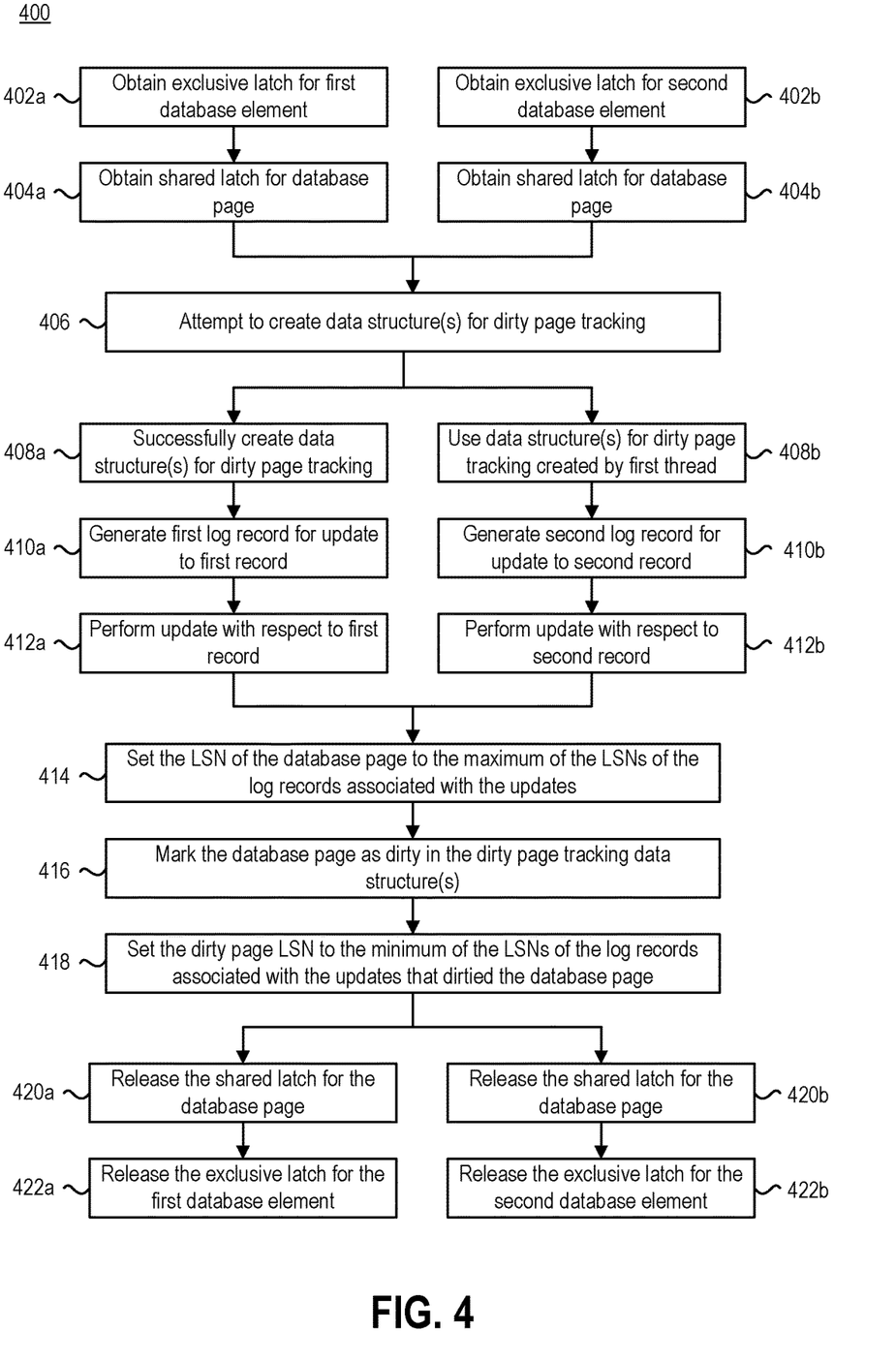
FIG. 4 illustrates a method for supporting concurrent updates to a database page in a database system that uses write-ahead logging techniques.

FIG. 4 illustrates a method 400 for supporting concurrent updates 316a-b to a database page 304 in a database system 300 that uses write-ahead logging techniques. In addition to showing how multiple threads 308a-b may concurrently perform updates 316a-b with respect to a database page 304, the method 400 also illustrates how recovery algorithms may be modified in order to accommodate shared access to the database page 304.

In the depicted method 400, some of the operations 402a, 404a, 408a, 410a, 412a, 420a, 422a may be performed by the first thread 308a, while other operations 402b, 404b, 408b, 410b, 412b, 420b, 422b may be performed by the second thread 308b. The first thread 308a may perform the operations 402a, 404a, 408a, 410a, 412a, 420a, 422a in parallel with the second thread 308b performing the operations 402b, 404b, 408b, 410b, 412b, 420b, 422b. The other operations 406, 414, 416, 418 in the method 400 may be performed collectively by both of the threads 308a-b working together and/or by one or more other components of the database system 300.

In accordance with the method 400, a first thread 308a that is going to update a first record 306a in a database page 304 may obtain 402a an exclusive latch 310a for the first database element 302a. The first thread 308a may also obtain 404a a shared latch 312a for the database page 304. In parallel with these operations 402a, 404a being performed by the first thread 308a, a second thread 308b that is going to update a second record 306b in the database page 304 may obtain 402b an exclusive latch 310b for the second database element 302b and obtain 404b a shared latch 312b for the database page 304.

Both the first thread 308a and the second thread 308b may attempt 406 to create one or more data structures 322 for tracking dirty pages. The threads 308a-b may use one or more compare-and-swap operations to attempt to set up the data structure(s) 322 so that only one of the threads 308a-b successfully creates the data structure(s) 322. In some implementations, the threads 308a-b may use one or more interlocked compare exchange (ICX) functions to attempt to set up the data structure(s) 322. For purposes of the present example, it will be assumed that the first thread 308a successfully creates 408a the dirty page tracking data structure(s) 322 and that the second thread 308b fails. The second thread 308b then uses 408b the dirty page tracking data structure(s) 322 that were created by the first thread 308a.

The first thread 308a may generate 410a a first log record 314a corresponding to the update 316a that will be performed with respect to the first record 306a. In this example, the LSN 318a of the first log record 314a has a value of L1. The second thread 308b may generate 410b a second log record 314b corresponding to the update 316b that will be performed with respect to the second record 306b. In this example, the LSN 318b of the second log record 314b has a value of L2, where L2>L1.

The first thread 308a may perform 412a an update 316a with respect to the first record 306a in the database page 304, and the second thread 308b may perform 412b an update 316b with respect to the second record 306b in the database page 304. The updates 316a-b may be performed in a way that ensures atomicity. In other words, the first thread 308a may perform 412a the update 316a with respect to the first record 306a in a way that does not interfere with other concurrent updates to the database page 304 (including the update 316b performed by the second thread 308b with respect to the second record 306b). Similarly, the second thread 308b may perform 412b the update 316b with respect to the second record 306b in a way that does not interfere with other concurrent updates to the database page 304 (including the update 316a performed by the first thread 308a with respect to the first record 306a). To ensure atomicity, one or more compare-and-swap operations may be used.

The LSN 324 of the database page 304 may be set 414 to the maximum of the LSNs 318a-b of the log records 314a-b associated with the updates 316a-b that have been performed with respect to the database page 304. In the present example, the LSN 324 of the database page 304 may be set 414 to L2.

The database page 304 may be marked 416 as "dirty" in the dirty page tracking data structure(s) 322. The dirty page LSN 328 may be set 418 to the minimum of the LSNs 318a-b of the log records 314a-b associated with the updates 316a-b that dirtied the database page 304. Thus, in the present example, the dirty page LSN 328 corresponding to the database page 304 may be set to L1.

When the log records 314a-b have been generated 410a-b, the updates 316a-b have been performed 412a-b, the LSN 324 of the database page 304 has been set 414, the database page 304 has been marked 416 as dirty in the dirty page tracking data structure(s) 322, and the dirty page LSN 328 has been set 418, the first thread 308a may release 420a the shared latch 312a for the database page 304 and release 422a the exclusive latch 310a for the first database element 302a. Similarly, the second thread 308b may release 420b the shared latch 312b for the database page 304 and release 422b the exclusive latch 310b for the second database element 302b. At some point thereafter, the updates 316a-b may be flushed to disk.

Figure 5:
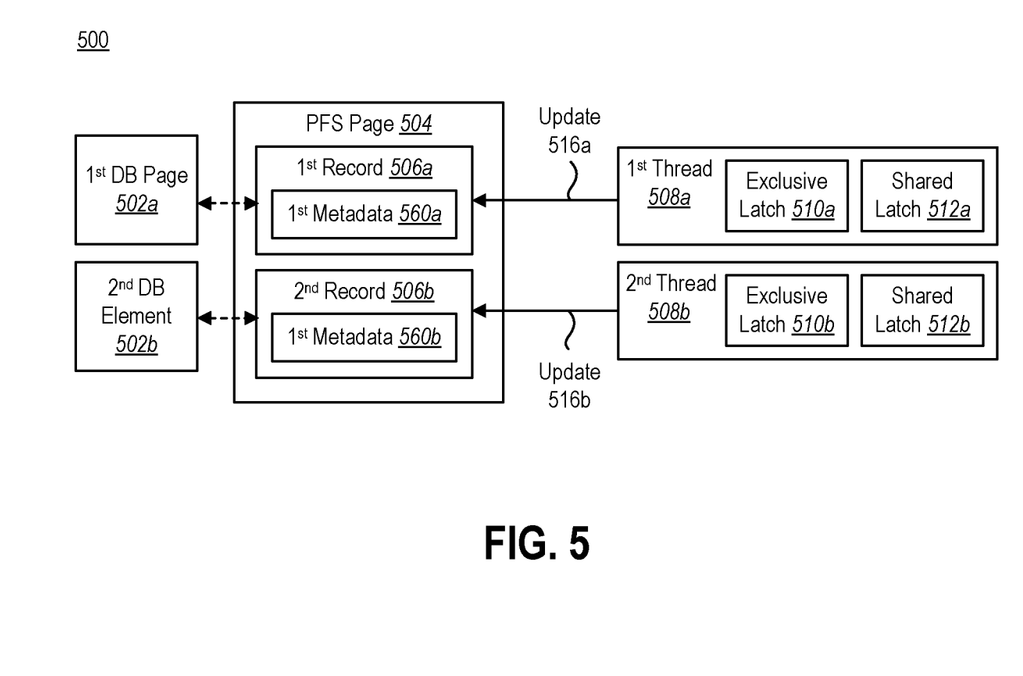
FIG. 5 illustrates an example of a database system in which the database page being updated is a page free space (PFS) page.

FIG. 5 illustrates another example of a database system 500 that is configured to support concurrent updates to a database page in accordance with the present disclosure. In the example shown in FIG. 5, the database page being updated is a page free space (PFS) page 504.

A PFS page 504 is a special database page that may be used to hold metadata about other database pages. Each page within the database system 500 may have a record within a PFS page 504. Although just one PFS page 504 is shown in FIG. 5, a database system may include multiple PFS pages. A PFS page 504 typically includes records for a relatively large number of different database pages (e.g., 8088 pages). Each record may be a fixed size (e.g., one byte). The record within a PFS page 504 that corresponds to a particular database page may include metadata about that database page, such as its allocation/deallocation status, its page usage status, whether the page has versions, whether the page has ghost records, whether the page is an IAM (Identity and Access Management) page, etc.

In FIG. 5, the PFS page 504 is shown with multiple records, including a first record 506a that includes first metadata 560a corresponding to a first database page 502a and a second record 506b that includes second metadata 560b corresponding to a second database page 502b. In accordance with the present disclosure, these records 506a-b may be updated in parallel.

If a first thread 508a obtains exclusive access to the first database page 502a, this may prevent another thread from updating the first record 506a in the PFS page 504a as long as the first thread 508a has exclusive access to the first database page 502a. Thus, to facilitate parallel updating of the records 506a-b in the PFS page 504, the first thread 508a may obtain exclusive access to the first database page 502a and shared access to the PFS page 504, so that other threads may also have shared access to the PFS page 504. Similarly, the second thread 508b may obtain exclusive access to the second database page 502b and shared access to the PFS page 504. This would allow both threads 508a-b to concurrently perform updates 516a-b with respect to the records 506a-b in the PFS page 504.

In some implementations, the first thread 508a may obtain an exclusive latch 510a for the first database page 502a and a shared latch 512a for the PFS page 504. The second thread 508b may obtain an exclusive latch 510b for the second database page 502b and a shared latch 512b for the PFS page 504. Log records may be generated and dirty page tracking may be performed in a manner similar to the examples discussed previously.

Figure 6A:
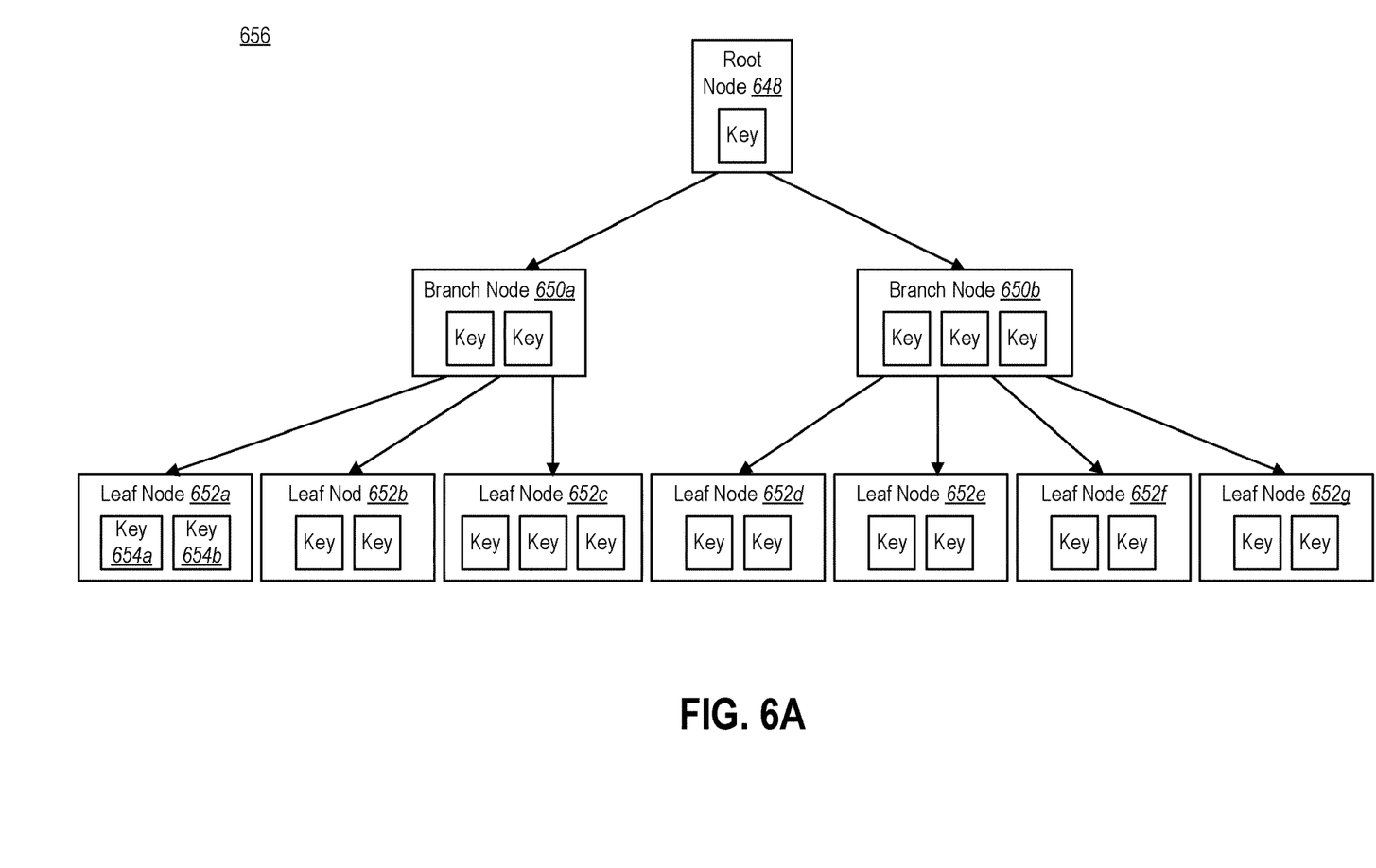
FIGS. 6A-B illustrate an example of a database system in which the database page being updated corresponds to a node that is part of a B-tree representation of data.
Figure 6B:
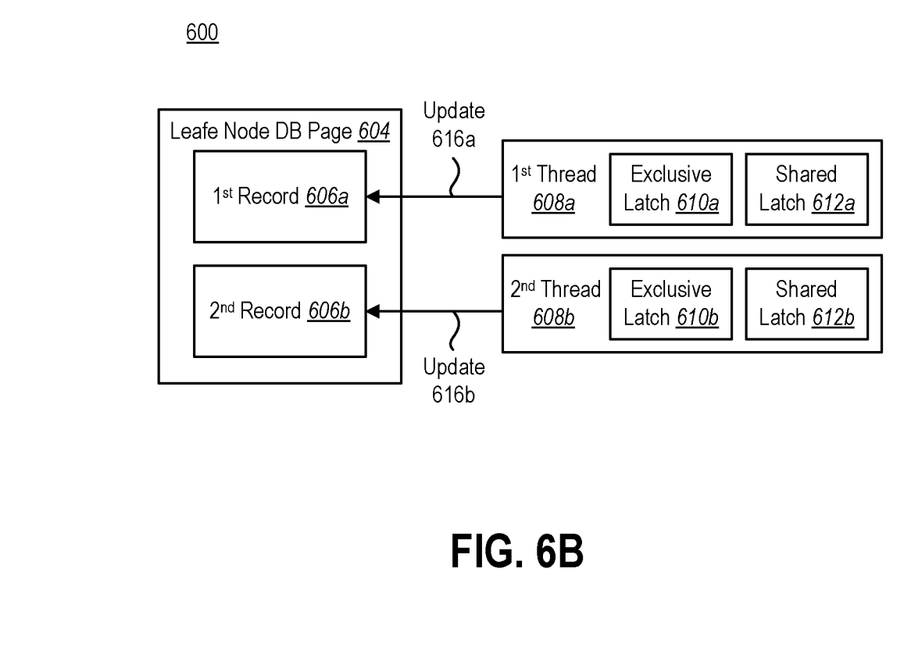

FIGS. 6A-B illustrate another example of a database system 600 that is configured to support concurrent updates to a database page in accordance with the present disclosure. In the example shown in FIGS. 6A-B, the database page being updated corresponds to a node that is part of a B-tree representation of data. An example of a B-tree 656 is shown in FIG. 6A. The B-tree 656 includes a root node 648, a plurality of branch nodes 650a-b, and a plurality of leaf nodes 652a-g.

Referring to both the B-tree 656 shown in FIG. 6A and the database system 600 shown in FIG. 6B, suppose that a first thread 608a is going to perform an update 616a with respect to data corresponding to a first key 654a in the leaf node 652a, and a second thread 608b is going to perform an update 616b with respect to data corresponding to a second key 654b in the leaf node 652a. In accordance with the present disclosure, these updates 616a-b may be performed simultaneously.

To facilitate concurrent updates 616a-b, the threads 608a-b may access a database page 604 that corresponds to the leaf node 652a. This database page 604 may be referred to herein as a leaf node database page 604. The first thread 608a may obtain exclusive access to the key 654a and shared access to the leaf node database page 604. For example, the first thread 608a may obtain an exclusive latch 610a for the key 654a and a shared latch 612a for the leaf node database page 604 that includes a record 606a corresponding to the key 654a. Similarly, the second thread 608b may obtain an exclusive latch 610b for the key 654b and a shared latch 612b for the leaf node database page 604 that includes a record 606b corresponding to the key 654b. Log records may be generated and dirty page tracking may be performed in a manner similar to the examples discussed previously.

Figure 7:
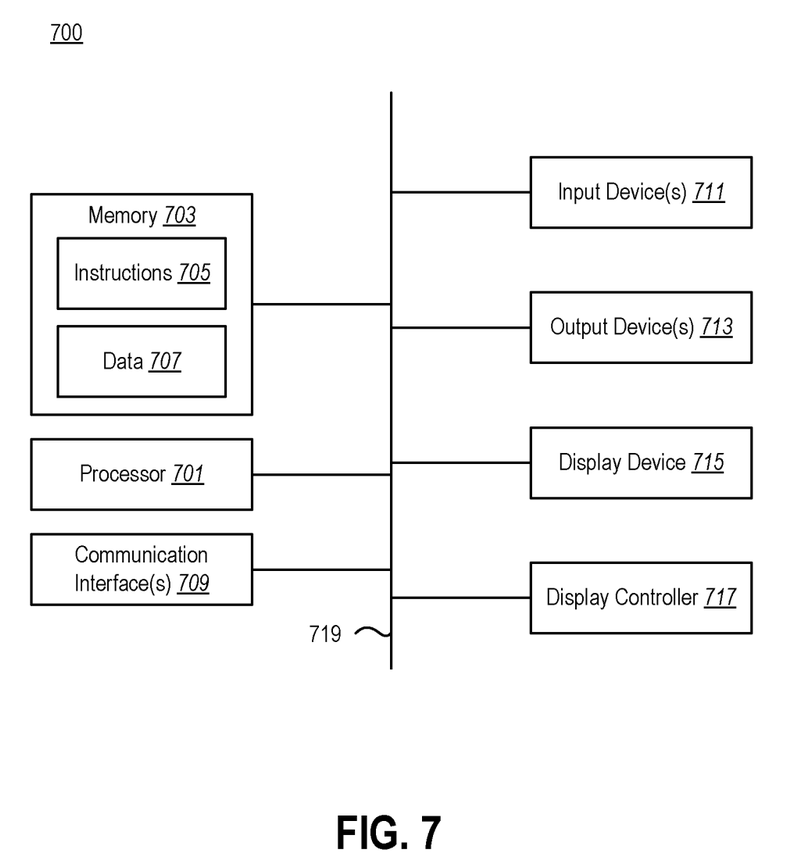
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 8 as a bus system 719.

In accordance with an aspect of the present disclosure, a method for supporting concurrent updates to a database page is disclosed. The method may include providing shared access to the database page, performing a first update with respect to a first record in the database page, and performing a second update with respect to a second record in the database page. The first update and the second update may be performed concurrently while the shared access to the database page is being provided. The method may also include synchronizing the first update and the second update. In some implementations, neither the first update nor the second update may cause cascading operations to be performed with respect to the database page.

The first update may be performed by a first thread and the second update may be performed by a second thread. The first thread and the second thread may obtain the shared access to the database page. To synchronize the first update and the second update, the first thread may obtain exclusive access to a first database element corresponding to the first record and the second thread may obtain exclusive access to a second database element corresponding to the second record. The first thread may obtain a first exclusive latch corresponding to a first database element, and a first shared latch corresponding to the database page. The second thread may obtain a second exclusive latch corresponding to a second database element, and a second shared latch corresponding to the database page.

The method may be performed by a database system that implements write-ahead logging. The method may further include using compare-and-swap operations to generate log records for the first update and the second update, and manage dirty page synchronization.

In some implementations, the database page may include a page free space (PFS) page. As another example, the database page may include a node that is part of a B-tree representation of data.

In accordance with another aspect of the present disclosure, a method for supporting concurrent updates to a database page in a database system that implements write-ahead logging is disclosed. In accordance with the method, a first thread may obtain exclusive access to a first database element that corresponds to a first record in the database page. A second thread may obtain exclusive access to a second database element that corresponds to a second record in the database page. The first thread may perform a first update with respect to the first record in the database page, and the second thread performing a second update with respect to the second record in the database page. The first update and the second update may be performed concurrently. Neither the first thread nor the second thread may have exclusive access to the database page.

In some implementations, the database page may include a page free space (PFS) page. The first record may include first metadata corresponding to a first database page. The second record may include second metadata corresponding to a second database page.

In some implementations, the database page may correspond to a node that is part of a B-tree representation of data. The first record may correspond to a first key of the node. The second record may correspond to a second key of the node.

The method may further include generating a first log record for the first update, generating a second log record for the second update, and setting a log sequence number of the database page to a maximum of the first log sequence number and the second log sequence number. The first log record may include a first log sequence number. The second log record may include a second log sequence number.

Both the first thread and the second thread may attempt to create a dirty page tracking data structure. Only one of the first thread or the second thread may successfully create the dirty page tracking data structure.

The method may further include creating at least one data structure for dirty page tracking, generating a first log record for the first update, and generating a second log record for the second update. The first log record may include a first log sequence number. The second log record may include a second log sequence number. The method may further include setting a dirty page log sequence number to a minimum of the first log sequence number and the second log sequence number.

In accordance with another aspect of the present disclosure, a system is disclosed for supporting concurrent updates to a database. The system may include one or more processors, memory in electronic communication with the one or more processors, and a database page stored in the memory. The database page may include a first record and a second record. Instructions may also be stored in the memory. The instructions may be executable by the one or more processors to provide shared access to the database page, perform a first update with respect to a first record in the database page, and perform a second update with respect to a second record in the database page. The first update and the second update may be performed concurrently while the shared access to the database page is being provided. The instructions may also be executable by the one or more processors to synchronize the first update and the second update.

In some implementations, the first update may be performed by a first thread. The second update may be performed by a second thread. Neither the first thread nor the second thread may have exclusive access to the database page.

The first update may be performed by a first thread and the second update may be performed by a second thread. The instructions may be additionally executable by the one or more processors to cause the first thread to obtain a first exclusive latch corresponding to a first database element, the first thread to obtain a first shared latch corresponding to the database page, the second thread to obtain a second exclusive latch corresponding to a second database element, and the second thread to obtain a second shared latch corresponding to the database page.

The instructions may be additionally executable by the one or more processors to generate a first log record for the first update and to generate a second log record for the second update. The first log record may include a first log sequence number. The second log record may include a second log sequence number. The instructions may be additionally executable by the one or more processors to set a log sequence number of the database page to a maximum of the first log sequence number and the second log sequence number.

The instructions may be additionally executable by the one or more processors to create at least one data structure for dirty page tracking, generate a first log record for the first update, and generate a second log record for the second update. The first log record may include a first log sequence number. The second log record may include a second log sequence number. The instructions may be additionally executable by the one or more processors to set a dirty page log sequence number to a minimum of the first log sequence number and the second log sequence number.

In some implementations, the database page may include a page free space (PFS) page. As another example, the database page may include a node that is part of a B-tree representation of data.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for supporting concurrent updates to a database page in a database system that implements write-ahead logging, comprising:
    a first thread obtaining exclusive access to a first database element that corresponds to a first record in the database page;
    a second thread obtaining exclusive access to a second database element that corresponds to a second record in the database page, wherein records in the database page have a fixed size;
    the first thread performing a first update with respect to the first record in the database page;
    generating a first log record for a transaction log, the first log record corresponding to the first update, the first log record comprising a first log sequence number;
    the second thread performing a second update with respect to the second record in the database page, wherein the first update and the second update are performed concurrently;
    generating a second log record for the transaction log, the second log record corresponding to the second update, the second log record comprising a second log sequence number;
    setting a log sequence number of the database page to a maximum of the first log sequence number corresponding to the first log record in the transaction log and the second log sequence number corresponding to the second log record in the transaction log; and
    attempting, by both the first thread and the second thread, to create a dirty page tracking data structure, wherein only one of the first thread or the second thread successfully creates the dirty page tracking data structure.

2. The method of claim 1, wherein neither the first thread nor the second thread has exclusive access to the database page.

3. The method of claim 1, wherein:
the database page comprises a page free space (PFS) page;
the first record comprises first metadata corresponding to a first database page; and
the second record comprises second metadata corresponding to a second database page.

4. The method of claim 1, wherein:
the database page corresponds to a node that is part of a B-tree representation of data;
the first record corresponds to a first key of the node; and
the second record corresponds to a second key of the node.

5. The method of claim 1, further comprising:
creating at least one data structure for dirty page tracking;
generating a first log record for the first update, the first log record comprising a first log sequence number;
generating a second log record for the second update, the second log record comprising a second log sequence number; and
setting a dirty page log sequence number to a minimum of the first log sequence number and the second log sequence number.

6. The method of claim 1, wherein the first update and the second update are structured so that they do not result in cascading operations being performed with respect to the database page.

7. The method of claim 1, wherein the first update and the second update are structured so that:
the first update and the second update do not cause any of the records in the database page to be moved to a different database page; and
the first update and the second update do not cause any other records from any other database page to be moved to the database page.

8. A method for supporting concurrent updates to a database page in a database system that implements write-ahead logging, comprising:
a first thread obtaining exclusive access to a first database element that corresponds to a first record in the database page;
a second thread obtaining exclusive access to a second database element that corresponds to a second record in the database page, wherein records in the database page have a fixed size;
the first thread performing a first update with respect to the first record in the database page;
generating a first log record for a transaction log, the first log record corresponding to the first update, the first log record comprising a first log sequence number;
the second thread performing a second update with respect to the second record in the database page, wherein the first update and the second update are performed concurrently;
generating a second log record for the transaction log, the second log record corresponding to the second update, the second log record comprising a second log sequence number;
attempting, by both the first thread and the second thread, to create a dirty page tracking data structure, wherein only one of the first thread or the second thread successfully creates the dirty page tracking data structure; and
setting a dirty page log sequence number to a minimum of the first log sequence number corresponding to the first log record in the transaction log and the second log sequence number corresponding to the second log record in the transaction log.

9. The method of claim 8, wherein the first update and the second update are structured so that they do not result in cascading operations being performed with respect to the database page.

10. The method of claim 8, wherein neither the first thread nor the second thread has exclusive access to the database page.

11. The method of claim 8, wherein:
the database page comprises a page free space (PFS) page;
the first record comprises first metadata corresponding to a first database page; and
the second record comprises second metadata corresponding to a second database page.

12. The method of claim 8, wherein:
the database page corresponds to a node that is part of a B-tree representation of data;
the first record corresponds to a first key of the node; and
the second record corresponds to a second key of the node.

13. The method of claim 8, further comprising setting a log sequence number of the database page to a maximum of the first log sequence number and the second log sequence number.

14. A system for supporting concurrent updates to a database page in a database system that implements write-ahead logging, comprising:
one or more processors;
memory in electronic communication with the one or more processors; and
instructions stored in the memory, the instructions being executable by the one or more processors to:
obtain, by a first thread, exclusive access to a first database element that corresponds to a first record in the database page;
obtain, by a second thread, exclusive access to a second database element that corresponds to a second record in the database page, wherein records in the database page have a fixed size;
perform, by the first thread, a first update with respect to the first record in the database page;
perform, by the second thread, a second update with respect to the second record in the database page, wherein the first update and the second update are performed concurrently;
generate a first log record for a transaction log, the first log record corresponding to the first update, the first log record comprising a first log sequence number;
generate a second log record for the transaction log, the second log record corresponding to the second update, the second log record comprising a second log sequence number;
set a log sequence number of the database page to a maximum of the first log sequence number corresponding to the first log record in the transaction log and the second log sequence number corresponding to the second log record in the transaction log;
attempt, by both the first thread and the second thread, to create a dirty page tracking data structure, wherein only one of the first thread or the second thread successfully creates the dirty page tracking data structure; and set a dirty page log sequence number to a minimum of the first log sequence number corresponding to the first log record in the transaction log and the second log sequence number corresponding to the second log record in the transaction log.

15. The system of claim 14, wherein:
the first thread successfully creates the dirty page tracking data structure; and
the second thread uses the dirty page tracking data structure created by the first thread.

16. The system of claim 14, wherein the first update and the second update are structured so that they do not result in cascading operations being performed with respect to the database page.

17. The system of claim 14, wherein neither the first thread nor the second thread has exclusive access to the database page.

18. The system of claim 14, wherein:
the database page comprises a page free space (PFS) page;
the first record comprises first metadata corresponding to a first database page; and
the second record comprises second metadata corresponding to a second database page.

* * * * *